US009851521B2

(12) United States Patent
Pelletier et al.

(10) Patent No.: US 9,851,521 B2
(45) Date of Patent: Dec. 26, 2017

(54) CONNECTORIZED OPTICAL CHIP ASSEMBLY

(71) Applicant: Ciena Corporation, Hanover, MD (US)

(72) Inventors: Francois Pelletier, Quebec (CA); Christine Latrasse, Quebec (CA); Marie-Josée Picard, Quebec (CA); Michel Poulin, Quebec (CA); Yves Painchaud, Quebec (CA)

(73) Assignee: Ciena Corporation, Hanover, MD (US)

( * ) Notice: Subject to any disclaimer, the term of this patent is extended or adjusted under 35 U.S.C. 154(b) by 22 days.

(21) Appl. No.: 14/793,114

(22) Filed: Jul. 7, 2015

(65) Prior Publication Data

US 2016/0004021 A1 Jan. 7, 2016

Related U.S. Application Data

(60) Provisional application No. 62/021,323, filed on Jul. 7, 2014.

(51) Int. Cl.
*G02B 6/42* (2006.01)
*G02B 6/38* (2006.01)

(52) U.S. Cl.
CPC ........... *G02B 6/4292* (2013.01); *G02B 6/421* (2013.01); *G02B 6/3839* (2013.01); *G02B 6/4204* (2013.01); *G02B 6/428* (2013.01)

(58) Field of Classification Search
CPC .... G02B 6/4292; G02B 6/421; G02B 6/4204; G02B 6/428; G02B 6/3839; G02B 6/3897; G02B 6/42; G02B 6/4201; G02B 6/4256; G02B 6/4257; G02B 6/4261
See application file for complete search history.

(56) References Cited

U.S. PATENT DOCUMENTS

| | | | | |
|---|---|---|---|---|
| 5,408,557 | A | 4/1995 | Hsu | |
| 5,432,879 | A | 7/1995 | Lee | |
| 8,639,073 | B2 | 1/2014 | Pelletier et al. | |
| 2002/0172471 | A1 | 11/2002 | Slater et al. | |
| 2013/0230285 | A1 * | 9/2013 | Skilnick | G02B 6/4248 385/93 |

* cited by examiner

*Primary Examiner* — John M Bedtelyon
(74) *Attorney, Agent, or Firm* — Osha Liang LLP

(57) ABSTRACT

A connectorized optical chip assembly connectable to an external optical fiber having a fiber connector is provided. The connectorized optical chip assembly includes a substrate, an optical chip having an on-chip optical waveguide and a connectorized interface. The connectorized interface includes an optical coupling element mounted in optical alignment with the on-chip optical waveguide. The connectorized interface includes a chip connector engaging the optical coupling element and configured for mating with the fiber connector of the external optical fiber, so as to provide an optical coupling of light between the optical coupling element and the external optical fiber. The connectorized optical chip assembly also includes a mechanical support structure supporting the connectorized interface onto the substrate. Preferably, the components of the connectorized optical assembly are made of materials heat resistant to temperatures used to melt solder in surface mount processes.

27 Claims, 12 Drawing Sheets

CONNECTORIZED OPTICAL CHIP ASSEMBLY

RELATED PATENT APPLICATION

The present application claims priority from U.S. provisional application No. 62/021,323 filed on Jul. 7, 2014, the entire contents of which is incorporated herein by reference.

TECHNICAL FIELD

The present invention relates to the coupling of light into optical chips, and more particularly concerns the coupling of light between an optical fiber and an optical waveguide on a chip, using a "pluggable" approach.

BACKGROUND

The efficient coupling of light from optical fibers to waveguides extending onto optical chips is of primary importance in various fields, including optical communications. Several techniques are known to couple optical fibers to on-chip optical waveguides. In typical approaches, the protective coating of the optical fiber is removed along a small length, and the bare portion of optical fiber cleaved and either glued directly to the optical chip, or inserted in a glass or ceramic ferule which is itself polished and glued to the optical chip. Such techniques can be used in non-hermetic environments since there is no air gap between the optical fiber and the chip. Other approaches make use of various type of lenses to couple the light into the on-chip optical waveguide, such as for example shaped-tip fiber, aspheric lenses, GRIN lenses, etc. However, such approach can typically be used only in hermetic environments. In either case, the subassembly thus realized leaves a piece of coated optical fiber, typically provided with an optical connector on its distal end, dangling from the optical chip, and forms what is called in the field a "pigtailed" component.

Referring to FIG. 1A (PRIOR ART), in some assemblies the optical fiber is attached to the side of a chip. In this case, appropriate on-chip inverted tapers and/or spot size converters can be used to improve the coupling efficiency between the on-chip optical waveguide and the optical fiber, by adapting as much as possible the optical modes on each side. V-grooves patterned in the chip structure can be used to ease the alignment of the fiber in front of the on-chip optical waveguide, ultimately making passive alignment possible. As shown in FIG. 1B (PRIOR ART), the fiber can also be attached to the top surface of the chip, for example using surface grating couplers. In this latter case, the fiber can be polished at appropriate angles such as described in U.S. Pat. No. 8,639,073 (PELLETIER et al).

The coupling of light from optical fibers into an optical chip can present some incompatibilities with typical chip design and manufacturing processes. In many applications, the optical chip includes electrical ports which need to be connected to an external circuit. Those connections can be realized through wire bonding. The electrical ports generally lie near the edges of the chip. However, for increased electrical port densities, it may be more suitable to use connections anywhere through the substrate. Through Silicon Vias (TSV), in the case of silicon-based chips, are good examples of such connections. To provide a high density of electrical connections, surface mount processes such as ball grid arrays (BGA) can be used to realize the permanent joint between the optical chip and the external electronic circuit (or Printed Circuit Board, PCB), as shown in FIG. 2 (PRIOR ART). BGAs or other surface mount processes typically use reflow in an oven to melt the solder balls at temperature above 183° C. for eutectic lead-tin solder, and above 220° C. for lead free tin based solder complying with Restriction of Hazardous Substances Directive (ROHS) such as the SAC305 solder, that contains 96.5% tin, 3% silver, and 0.5% copper. Such high temperatures have the effect of damaging optical fibers having a standard protective coating such as a dual coated acrylate, and damaging other heat sensitive components such as typical low temperature resistance polymer-based fiber connectors. Additionally, the very presence of an optical fiber attached to the chip is incompatible with many automated assembly techniques such as Surface Mount Technology (SMT); the pick-and-place machines used in such assembly lines are not able to manipulate an optical chip having a loose piece of fiber and its connector dangling.

There remains a need for a technique which makes it possible and practical to connect an optical fiber to a waveguide on a chip which ensures a proper alignment of the fiber with low insertion loss, while being compatible with the use of high temperatures in reflow processes.

SUMMARY

In accordance with one aspect, there is provided a connectorized optical chip assembly connectable to an external optical fiber having a fiber connector.

The connectorized optical chip assembly includes a substrate and an optical chip extending over the substrate and having an on-chip optical waveguide and a connectorized interface. The connectorized interface includes an optical coupling element mounted in optical alignment with the on-chip optical waveguide. The connectorized interface further includes a chip connector engaging the optical coupling element and configured for mating with the fiber connector of the external optical fiber so as to provide an optical coupling of light between the optical coupling element and the external optical fiber. Finally, the connectorized optical chip assembly also includes a mechanical support structure supporting the connectorized interface onto the substrate.

Preferably, the optical chip, the connectorized interface and the mechanical support structure are entirely made of materials heat resistant to at least a temperature used to melt solder in surface mount processes. For example temperatures above 183° C. for Eutectic lead-tin solder and above 220° C. for standard lead-free SAC305 solder.

In some embodiments, the optical coupling element may include a chip ferule affixed to the optical chip and at least one optical fiber segment mounted inside the chip ferule. In other embodiments, the optical coupling element may include chip lens mounted to the optical chip in optical alignment with the on-chip optical waveguide.

In accordance with another aspect, there is also provided a connectorized optical chip assembly connectable to an external optical fiber having a fiber connector, including a substrate, an optical chip having an on-chip optical waveguide and a connectorized interface. The connectorized interface includes an optical coupling element mounted in optical alignment with the on-chip optical waveguide, the optical coupling element comprising a chip ferule and at least one optical fiber segment mounted inside the chip ferule. The connectorized interface further includes a chip connector engaging the chip ferule and configured for mating with the fiber connector of the external optical fiber so as to provide an optical coupling of light between the at least one optical fiber segment and the external optical fiber. Finally, the connectorized optical chip assembly includes a mechanical support structure supporting the connectorized interface onto the substrate.

Advantageously, connectorized optical chip assemblies according to embodiments of the invention can be compatible with reflow manufacturing processes and SMT assembly technology, since external optical fibers can be connected to the optical chip after the optical chip subassembly has been soldered to a PCB or other substrate using a BGA or similar techniques.

Other features and advantages of the invention will be better understood upon a reading of preferred embodiments thereof with reference to the appended drawings.

DETAILED DESCRIPTION OF EMBODIMENTS

Figure 4A:
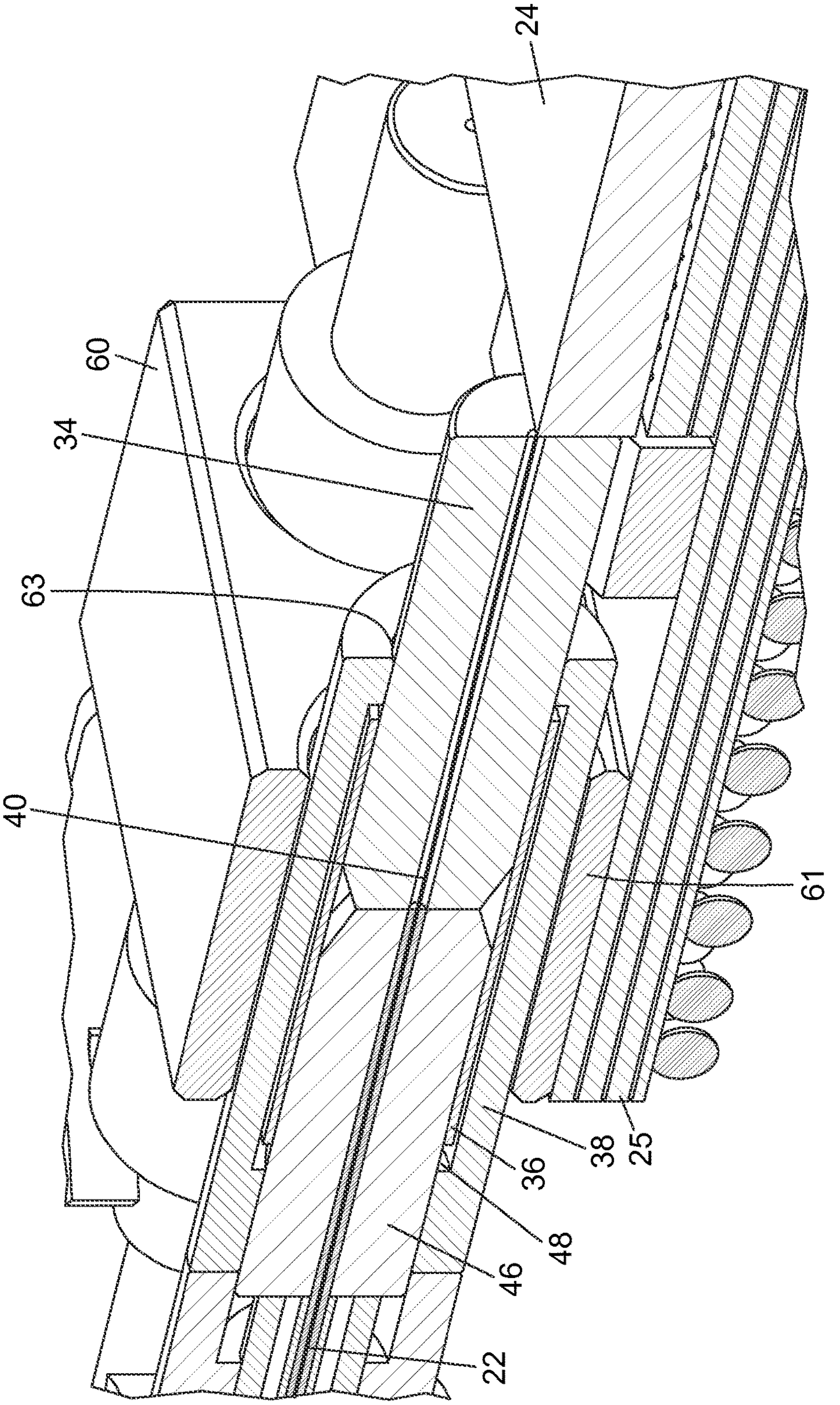
FIG. 4A is a perspective partial cross-sectional view of an optical chip assembly according to one embodiment.
Figure 4B:
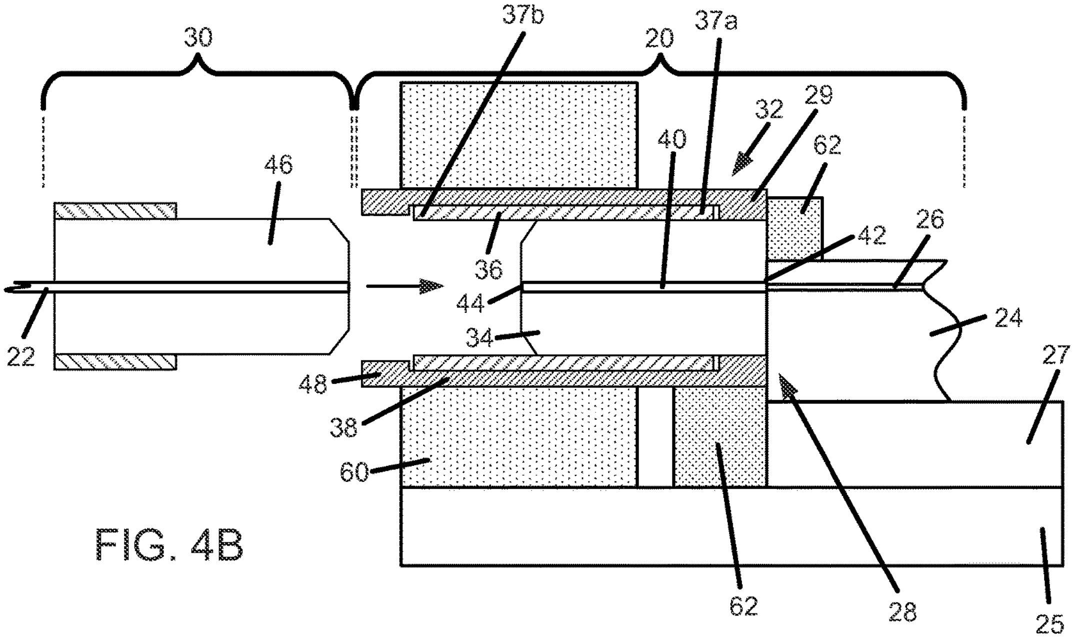
FIG. 4B is a schematized view of the assembly of FIG. 4A prior to connection with an external optical fiber.
Figure 4C:
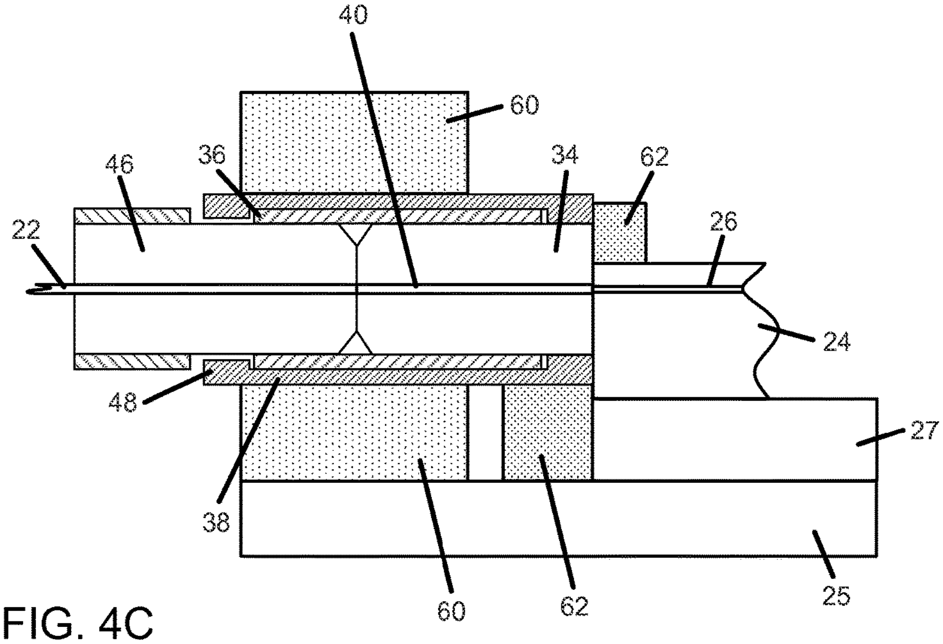
FIG. 4C is a schematized view of the assembly of FIG. 4A connected to an external optical fiber.

Referring to FIGS. 4A, 4B and 4C, there is shown a connectorized optical chip assembly 20 according to one embodiment.

One skilled in the art will readily understood that the expression "connectorized" is meant to refer to a component having a connector, standard or otherwise, suited for engagement with a mating connector on another component. In the present case, the connectorized optical chip assembly 20 is understood to be connectable to an external optical fiber 22 having a fiber connector 30 at one of its extremities. The external optical fiber 22 may be embodied by any type of optical fiber suitable to guide light for coupling into an optical chip or to receive light from such an optical chip. In particular, the external optical fiber 22 may be single mode or multimode, with a single or multiple cladding, and may be embodied by a standard fiber, a polarization maintaining (PM) fiber, a microstructured optical fiber (or "holey" fiber)

or any other appropriate specialized type of fiber. The external optical fiber 22 may be made of plastic, glass, quartz, silica or the like. Preferably, the fiber connector 30 may be a standard type fiber connector, for example the male component of a $\phi$1.25 mm or $\phi$2.5 mm ferrule connector having an endface surface quality of either PC, UPC, SPC, APC which are established by international standards. The connector clamping mechanism can be a standard format such as LC, FC, SC, MU or MT for fiber array. The connectorized optical chip assembly 20 includes an optical chip 24 provided with an on-chip optical waveguide 26. The optical chip 24 may be embodied by any wafer or similar structure forming the basis of an integrated circuit and supported by a suitable substrate 25. In some embodiments, a ceramic, PCB or SI interposer 27 may be provided between the substrate 25 and the optical chip 24. Typically, the optical chip 24 may be embodied by a superposition of semiconductor layers shaped to provide the desired optical and electrical functionalities. In one implementation, the optical chip 24 defines a Silicon-On-Insulator (SOI) structure. However, in other implementation the optical chip 24 may be made of any suitable materials such as InP, silica on silicon, etc.

The on-chip optical waveguide 26 may be embodied by a planar waveguide, that is, an optical waveguide provided in a substantially integrated configuration and including a light guiding path. While the term "planar" suggests a flat structure, the term "planar waveguide" is also meant to encompass structures made of a plurality of layers. Likewise, the term "light-guiding path" is understood to refer herein to a plane or an axis of a waveguide along which light can be guided. The on-chip optical waveguide 26 may for example be embodied by a slab waveguide, a strip waveguide, a ridge waveguide, a rib waveguide and the like. In various embodiments, the on-chip optical waveguide 26 may be defined by a plurality of layers stacked on the substrate, one of these of layers defining the light-guiding path.

Figure 1B:
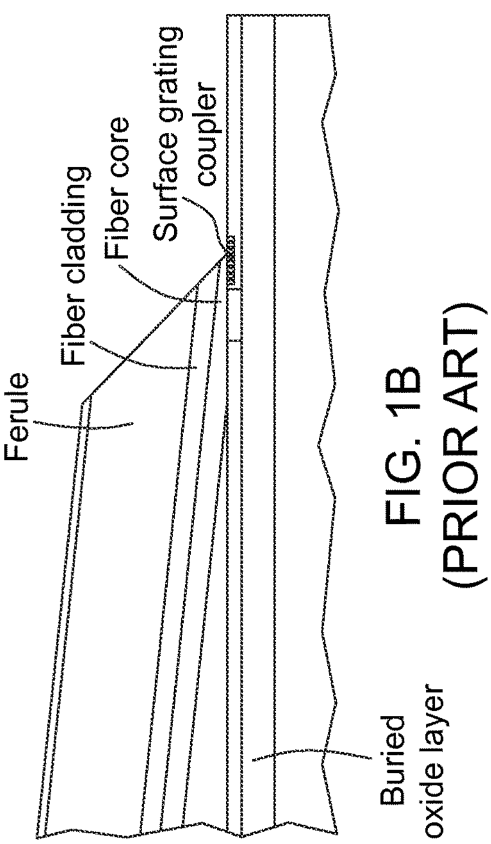
FIGS. 1A and 1B (PRIOR ART) are schematized representations of the coupling of an optical fiber on the side and on the top surface of an optical chip, respectively.
Figure 1A:
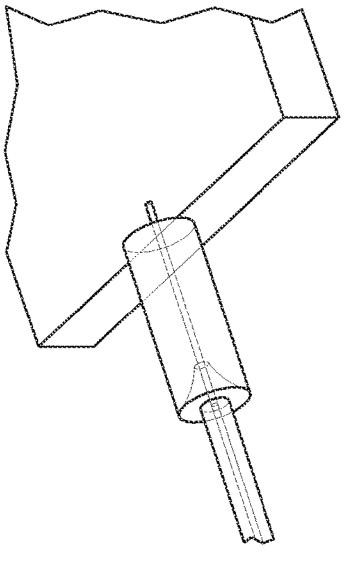
Figure 2:
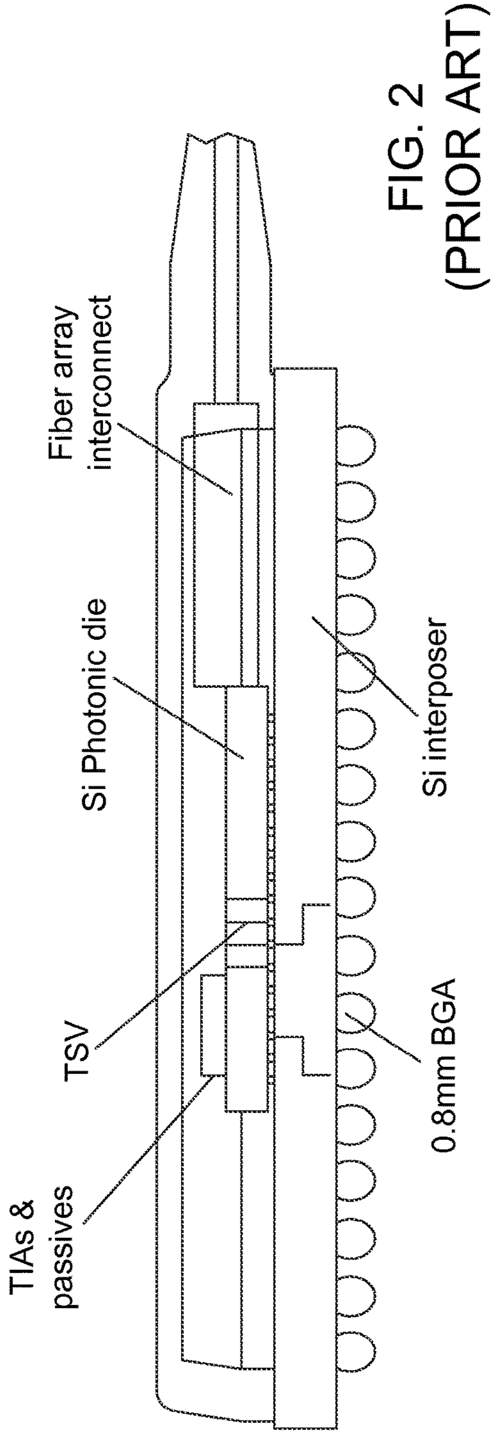
FIG. 2 (PRIOR ART) is an example of an optical assembly fixed onto a PCB using BGA.
Figure 3A:
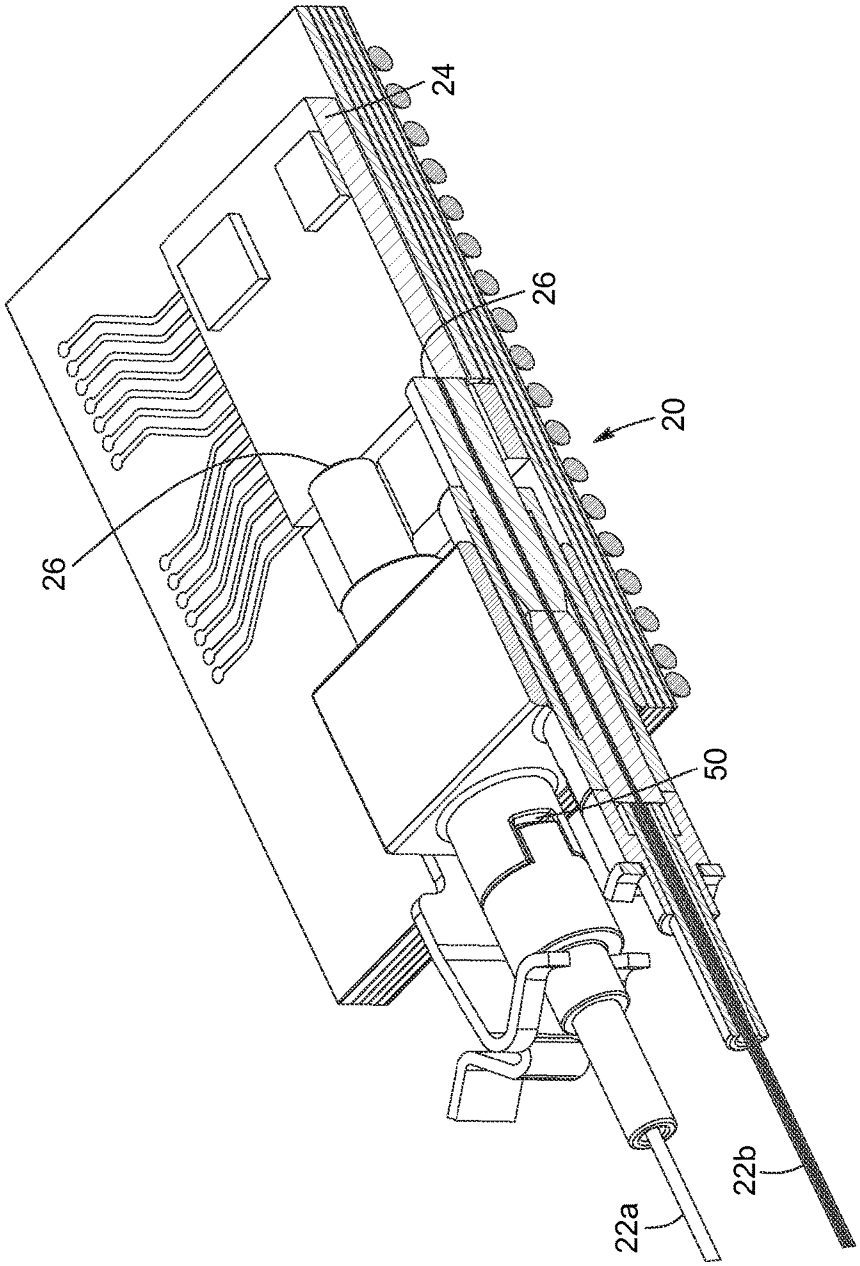
FIGS. 3A and 3B are perspective view of optical chip assemblies including a side and a top surface connectorized interface, respectively, according to some embodiments.
Figure 3B:
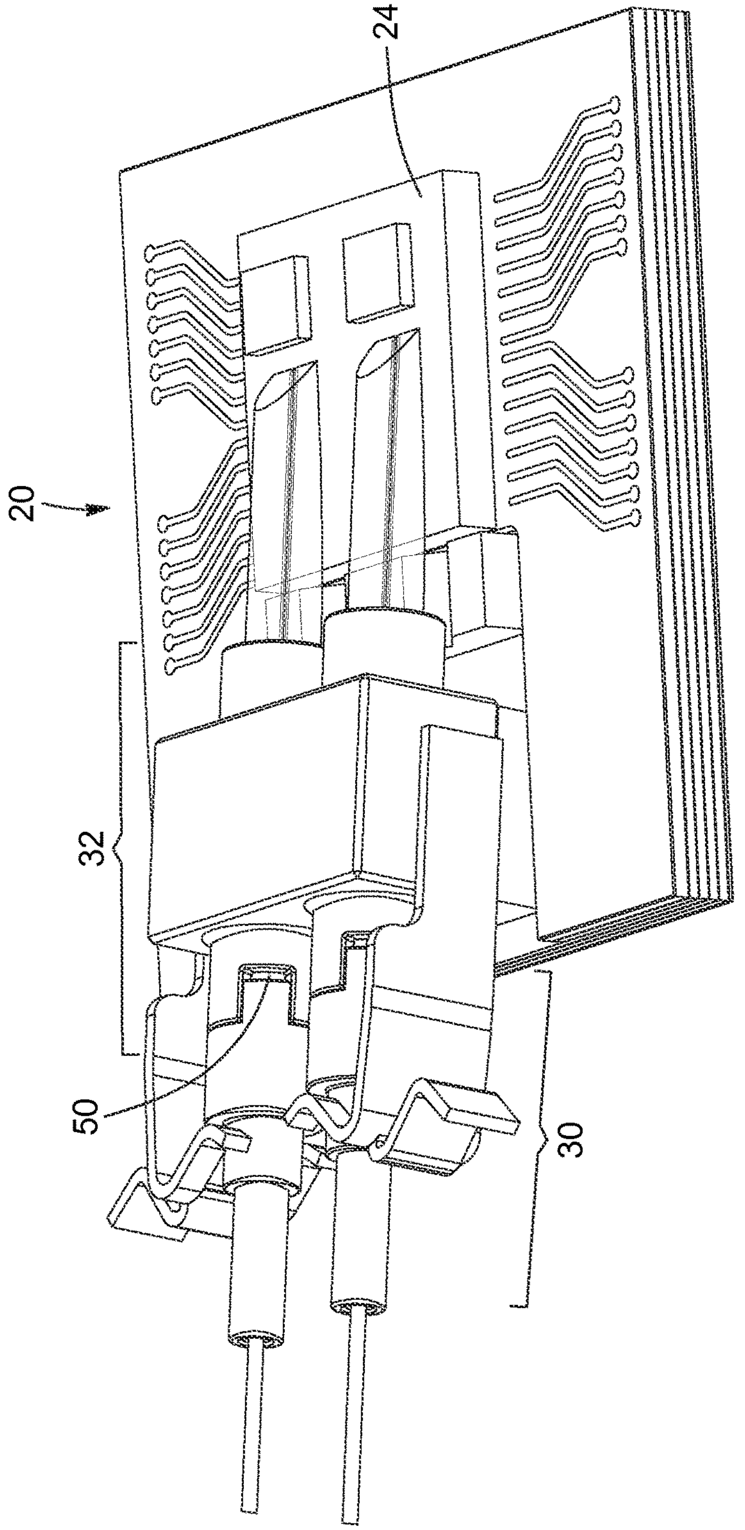
Figure 3C:
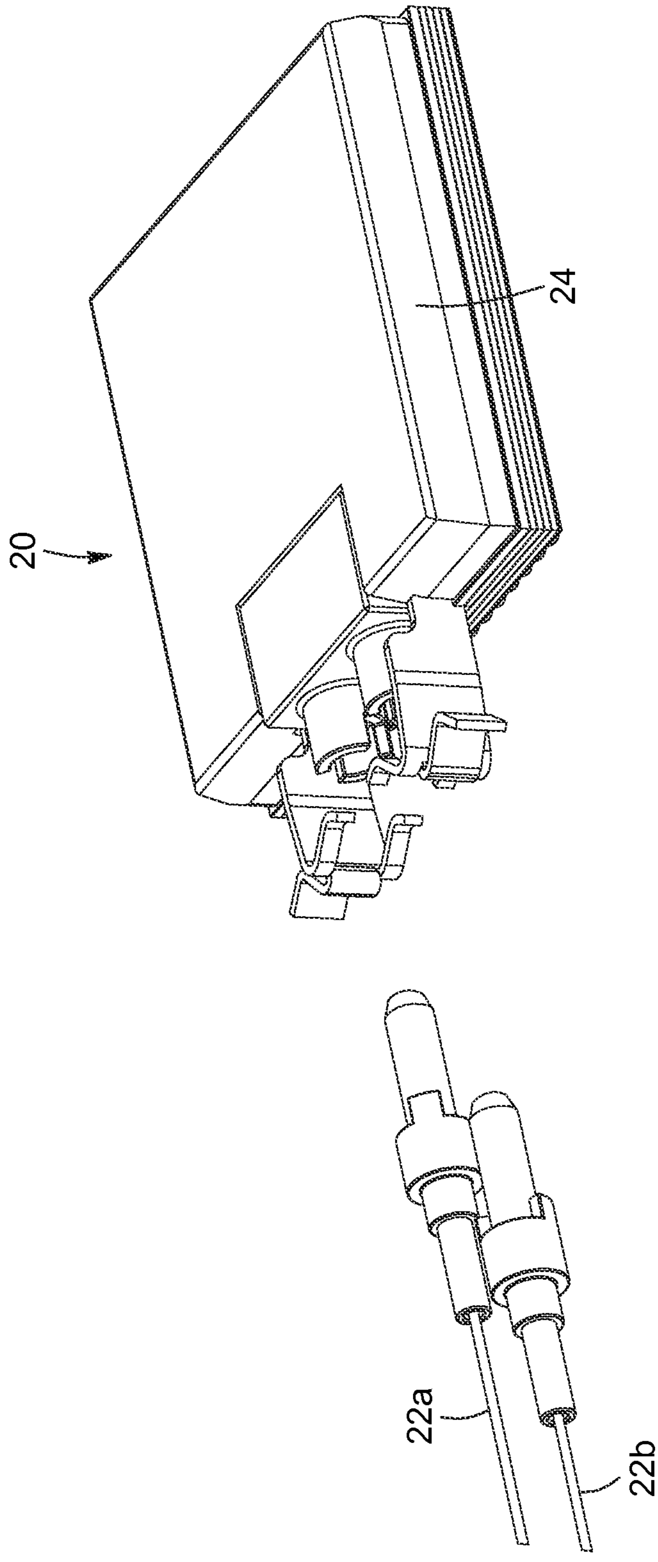
FIG. 3C is a perspective view of the packaged optical chip of FIG. 3A with disassembled external optical fibers.

Referring to FIGS. 3A and 3B, in possible implementations the connectorized optical chip assembly 20 may be configured to enable either a side coupling (FIG. 3A) or a surface coupling (FIG. 3B) of light from the optical fiber into the on-chip optical waveguide. FIG. 3C is a view of the packaged optical chip of FIG. 3A with two external optical fibers 22*a*, 22*b* aligned for connecting to the connectorized optical chip assembly 20 from the side. Typically, in a side coupling configuration the external optical fiber 22 is connected to a side surface of the optical chip 24, with its core longitudinally aligned with the on-chip optical waveguide 26 such that light continues to be guided along a same axis. On-chip inverted tapers and/or spot size converters can be used to improve the coupling efficiency between the on-chip optical waveguide 26 and the external optical fiber 22, by adapting as much as possible the optical modes on each side. In some variants, V-grooves (not shown) patterned in the structure of the optical chip 24 can be used to ease the alignment of the external optical fiber 22 in front of the on-chip optical waveguide 26. In a surface coupling arrangement, the external optical fiber 22 is connected to the top surface of the optical chip 24, and light can be coupled therebetween using surface grating couplers, for example. The external optical fiber 22 may be positioned parallel to the on-chip optical waveguide 26, or may form an acute angle with its end face polished at an appropriate angle.

It will be readily understood by one skilled in the art that connectorized optical chip assemblies according to different implementations may allow for the connection of multiple external optical fibers to corresponding on-chip optical waveguides on a same optical chip. Indeed, the embodiments illustrated in FIGS. 3A to 3C and 4A to 4C show two side by side connectorized interfaces each connectable to an external optical fiber and coupled to one on-chip optical waveguide.

Referring back to FIGS. 4A, 4B and 4C, it will be noted that in the example of this illustration, the external optical fiber 22 is shown engaging with the connectorized optical chip assembly 20 in a side coupling configuration. It will be readily understood by one skilled in the art that although the embodiments described herein are illustrated in a side coupling configuration, similar implementations may be made in a surface coupling configuration.

The connectorized optical chip assembly 20 includes a connectorized interface 28. The connectorized interface 28 includes an optical coupling element 29 mounted on the optical chip 24 in optical alignment with the on-chip optical waveguide 26 and a chip connector 32 secured to the optical chip 24. In the illustrated embodiment of FIGS. 4A to 4C, the optical coupling element 29 includes a chip ferule 34 affixed to the optical chip 24 and at least one optical fiber segment 40 mounted inside the chip ferule 34. The chip ferule 34 may be made of any appropriate material such as for example silica, borosilicate, kovar, zirconia, or the like. Typically, the chip ferule 34 and optical fiber segment 40 may be polished at the fiber extremity 44. Various types of polishing may be used, such as for example angle-polished (APC) or ultra-polished (UPC). Polarization maintaining (PM) connections are additionally possible options. The chip ferule 34 can be fixed to the surface of the optical chip 24 using an appropriate adhesive or other attachment scheme. Although in the illustrated embodiments the chip ferule 34 is shown contiguous to the side wall of the optical chip 24, in other variants the chip ferule 34 may be positioned at a slight distance from the side wall of the optical chip 24, a portion of the optical fiber segment projecting from the ferule to bridge the gap between the ferule and the optical chip, Such a variant may provide a greater flexibility of the connection between the optical coupling element and the optical chip to reduce stresses imposed on the connection.

In the illustrated embodiment of FIGS. 4A, 4B and 4C, a single optical fiber segment 40 is used. The optical fiber segment 40 is preferably coating-less, or is provided with a coating sufficiently resistant to heat up to temperatures typically used for reflow processes. The optical fiber segment 40 is preferably designed in order to provide a suitable light guiding transition between the on-chip optical waveguide 26 and the external optical fiber 22, and has a first extremity 42 optically coupled to the on-chip optical waveguide 26, and a second extremity 44 adapted for optical coupling to the external optical fiber 22. It will be readily understood that the coupling of the first extremity 42 of the optical fiber segment 40 with the on-chip optical waveguide 26 may be implemented in a variety of manners allowing the propagation of light between these two components with a level of loss acceptable to a target application. Some variants may involve direct alignment of the core of the optical fiber segment 40 with the core of the on-chip optical waveguide 26, while other variants may involve indirect coupling through evanescent wave coupling between parallel cores. In some embodiments, the coupling mechanism between the optical fiber segment 40 and the on-chip optical waveguide may involve a conversion of the spot size of the coupled light beam. Indeed, it is well-known that obtaining, at the output of an optical chip, a mode size compatible with that of a standard singlemode optical fibers such as SMF-28 is a challenge, especially for silicon photonic nano-waveguides. In some embodiments, the optical coupling element may therefore include a mode field adapter or spot size converter to increase the size of the waveguided mode in the on-chip optical waveguide to match as much as possible that of the external optical fiber. Example a light coupling schemes and spot size conversion can for example be found in U.S. patent application Ser. No. 14/635,602 (PAINCHAUD et al) filed on Mar. 2, 2015 and entitled "SPOT-SIZE CONVERTER FOR OPTICAL MODE CONVERSION AND COUPLING BETWEEN TWO WAVEGUIDES", the entire contents of which are incorporated herein by reference.

Figure 5:
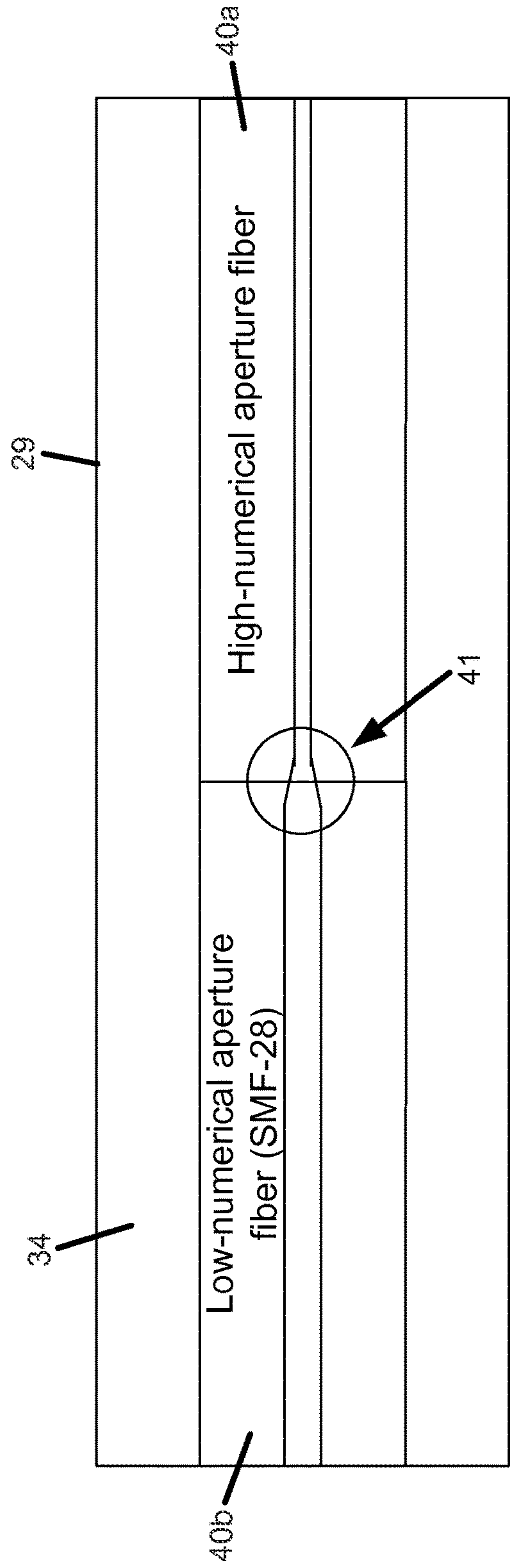
FIG. 5 is a schematized representation of a chip ferule housing spliced fiber segments.

Referring to FIG. 5, there is shown a configuration for the optical coupling element 29 according to one implementation. In the illustrated example of FIG. 5, the at least one optical fiber segment includes a proximal optical fiber segment 40*a* having a high numerical aperture selected for light coupling with the on-chip optical waveguide 26, and a distal optical fiber segment 40*b* having a low numerical aperture, for example a SMF-28 fiber, selected for light coupling with the external optical fiber. The proximal and distal optical fiber segments 40*a* and 40*b* are joined by a splice 41 extending within the chip ferule 34. Such an embodiment takes advantage of the fact that splicing of fibers with high numerical apertures to standard SMF-28 fiber can be made with low loss. Indeed, the splice 41 forms an adiabatic transition between the two types of optical fiber segments, thus distributing the change of mode field diameter over some length, providing advantages compared to an abrupt transition.

Referring back to FIGS. 4A, 4B and 4C, the chip connector 32 engages the optical coupling element 29 and is configured for mating with the fiber connector 30 of the external optical fiber 22 so as to provide an optical coupling of light between the optical coupling element 29 and the external optical fiber 22. In the illustrated embodiment, the chip connector 32 includes a chip connector housing 38 rigidly connected to the optical chip 24, and a guiding sleeve 36 mounted within the chip connector housing 38. The guiding sleeve 36 has a proximal end 37*a* engaging the optical coupling element 29 and a distal end 37*b* sized to receive an extremity of the fiber connector 30. The proximal end 37*a* of the guiding sleeve 36 is for example fitted over the chip ferule 34, while the distal end 37*b* defines an open cavity aligned with the extremity of the optical coupling element 29. Still in the illustrated embodiment, the guiding sleeve 36 is preferably defined by a C-shaped cylindrical component having a nominal diameter slightly smaller than a diameter of the chip ferule 34 or other outer portion of the optical coupling element 29, and made of a resilient material, such that its diameter can be widened to accommodate the chip ferule 34 therein. In such an embodiment, the chip connector 32 can accommodate a fiber connector 30 such as typically used in telecommunication applications where an extremity of the optical fiber 22 is itself received into a fiber ferule 46 that can be inserted within the chip housing 38. The guiding sleeve 36 is preferably rotatably free-floating within the chip connector housing 38, and longitudinally constrained within the chip connector housing 38, which may include an abutment shoulder 48 preventing the guide sleeve 36 from sliding out of the chip connector housing 38. In such a configuration, the connectorized external fiber 22 can be "plugged" into the guiding sleeve 36, and optically connect with the optical fiber segment 40 within the chip ferule 34 with low-loss thanks to the self-alignment mechanism provided by the guiding sleeve 36. Components dimensions and manufacturing tolerances are preferably selected to provide an alignment of the optical fiber 22 with the on-chip optical waveguide 26 within the precision level required for the target application.

The chip connector 32 and fiber connector 30 may be embodied by a variety of structures permitting the removable connection of the optical fiber 22 and on-chip optical waveguide 26 such that light is optically coupled between them, with a suitably low level of loss. One skilled in the art will understand that for an efficient light coupling to be achieved, the interaction between the chip and fiber connectors 32 and 30 should automatically result in an alignment of the components sufficiently precise to meet the requirements to which the connectorized optical chip assembly 20 is subjected. The fiber connector 30 and chip connector 32 can be secured together using an appropriate mechanism, such as a snapping or screwing mechanism, for example. Spring-loading can also be used to ensure proper contact between those two mechanical parts, such as best seen in FIGS. 3A and 3B. In some cases, as for example with APC or PM connections, an alignment key 50 (shown in FIGS. 3A and 3B) can be provided in the chip connector housing 38 to align the fiber connector 30 and the receiving end of the chip connector 32.

The connectorized optical chip assembly 20 further includes a mechanical support structure 60 supporting the connectorized interface 28 onto the optical chip 24. The mechanical support structure 60 may for example include a rectangular main block 61 affixed to the substrate 25 proximate the optical chip 24. The main block 61 is traversed by a passage 63 through which the chip connector housing 38 is received. The main block 61 is preferably made of metal, ceramic, heat-resistant molded plastic, or other materials resistant to heat. Of course, the mechanical support structure 60 may take other shapes. In another example, for example for surface coupling of the optical fiber such as shown in FIG. 3B, the mechanical support structure may be shaped so that the chip connector is held in place at an angle with respect to the plane of the substrate and of the optical chip.

Since the connectorized interface 28 is fixed relative to the optical chip 24 and to the substrate 25 onto which it is supported, in some embodiments one has to ensure that the strain applied to the connectorized optical chip assembly 20 when connecting the external optical fiber 22 does not exceed a threshold above which damage may be imposed at the joint between the chip ferule 34 and the interface of the optical chip 24, and therefore break the optical path. This is clearly different than in fiber-to-fiber mating sleeve technology, where both sides of a mating sleeve are allowed to move with respect to a central fixture. In the illustrated embodiment the mechanical support structure 60 is preferably designed and positioned to bring stiffness to the connectorized optical chip assembly 20. While the guiding sleeve 36 can move freely within the chip connector housing 38, it can nevertheless be a fragile part of the connectorized optical chip assembly 20. When the fiber connector 30 is inserted into the guiding sleeve 36, it may be pushed in with a slight angle and induce some shear. This shear can be transmitted to the chip ferule 34 through the guiding sleeve 36. The chip connector housing 38 holding the guiding sleeve 36 is preferably designed to limit the movement of the guiding sleeve 36, within which it is free to move, but could be too weak to prevent the displacement caused by such shear. The support structure 60 can therefore serve to block any exceeding displacement, and limit the strain to within acceptable levels. In some implementations, tolerance between the different parts may be engineered to minimize the strain transfer to the optical chip/ferule interface and distribute the efforts to stronger parts of the connectorized optical chip assembly. Parameters such as the choice of materials for the above-mentioned components, their lengths, the geometry of the guiding sleeve, etc. can be used to minimize such stresses as will be understood by those skilled in the art. Depending on the length of the support structure 60, additional strengthening blocks 62 may be added to provide strength to the joint between the chip ferule 34 glued to the optical chip 24 and the optical chip surface.

In accordance with some embodiments, the optical coupling element may include one or more lenses as an alternative to the optical fiber segment described above.

Figure 6A:
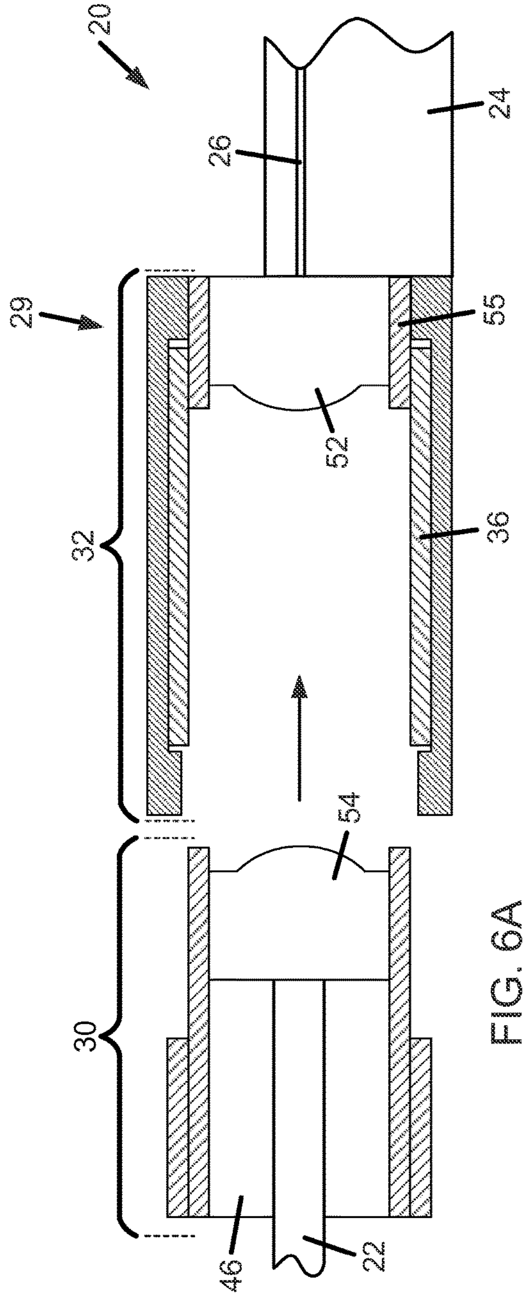
FIGS. 6A and 6B are schematized representations of an optical chip assembly, respectively shown unmated and mated, using aspherical lenses according to one variant.
Figure 6B:
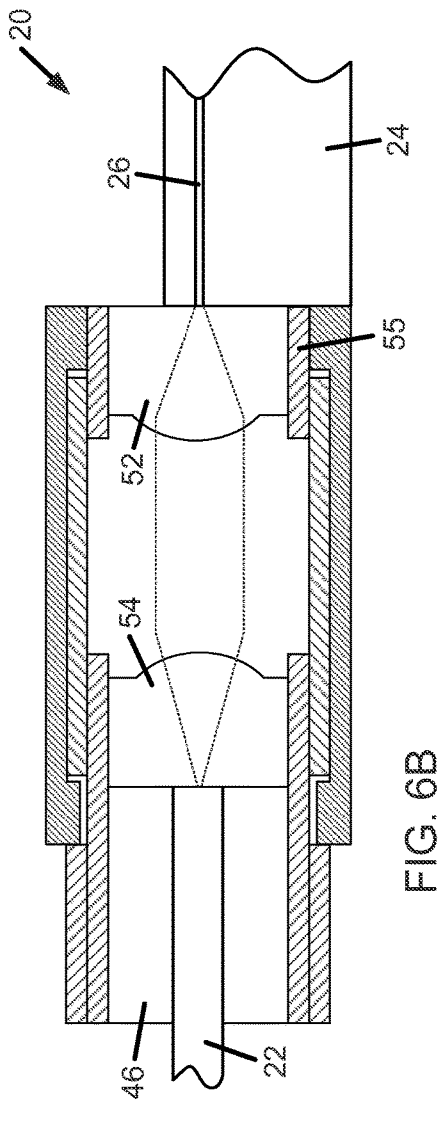

Referring to FIGS. 6A and 6B, there is shown another embodiment of a connectorized optical chip assembly 20, in which the optical coupling element 29 includes a chip lens mounted to the optical chip 24 in optical alignment with the on-chip optical waveguide 26. In this variant, the chip lens is an aspherical lens 52. The chip aspherical lens 52 may be glued or otherwise affixed directly to the optical chip 24, and designed and positioned to form a collimated beam from the light beam exiting the on-chip optical waveguide 26. In such a variant, the fiber connector 30 of the external optical fiber 22 may include a fiber aspherical lens 54 within the fiber ferule 46 or fixed to the extremity of the fiber ferule. The coupling of light can be performed by aligning both aspherical lenses 52 and 54 to couple the collimated beam therebetween. Here again, a guide sleeve 36 may serve as a self-guiding means. In the illustrated embodiment, the optical coupling element 29 further includes a lens holder 55 affixed to the optical chip 24, the chip lens 52 being mounted in the lens holder 55. The lens holder 55 is sized and shaped to fit within the guide sleeve 36.

Referring to FIGS. 7A to 7D, in other implementations the chip lens may be embodied by a graded-index (GRIN) lens 56 affixed to the optical chip surface. The use of a lens with graded index profile allows for collimating the optical beam out of the optical chip 24.

Advantageously, the use of a chip lens of either type broadens the compatibility of connectorized optical chip assemblies according to embodiments of the invention to applications requiring coupling of free-space propagating optical beams and/or beams travelling in optical fibers, both into and out of the optical chip 24.

Figure 7A:
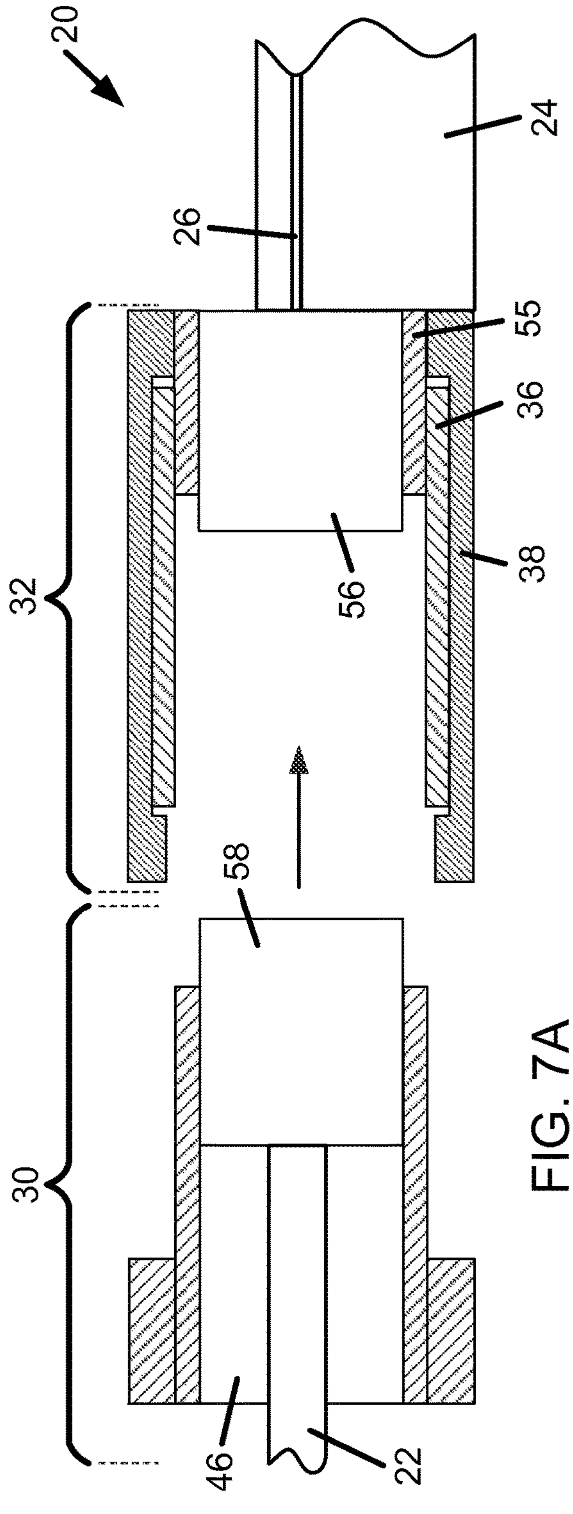
FIGS. 7A to 7D are schematized representations of variants of optical chip assemblies using a GRIN lens.

Referring more particularly to FIG. 7A, in the illustrated embodiment the chip GRIN lens 56 is glued or otherwise affixed to the output surface of the optical chip 24. A lens holder 55 surrounds the chip GRIN lens 56 around a portion of its length, the lens holder 55 being mounted within the chip connector housing 38 with the free-floating guide sleeve 36 therebetween. This connectorized optical chip assembly 20 according to this variant is adapted for coupling with a fiber connector 30 having a fiber ferule 46 holding the external fiber 22, and a fiber GRIN lens 58 affixed at the extremity of the fiber ferule 46.

Figure 7B:
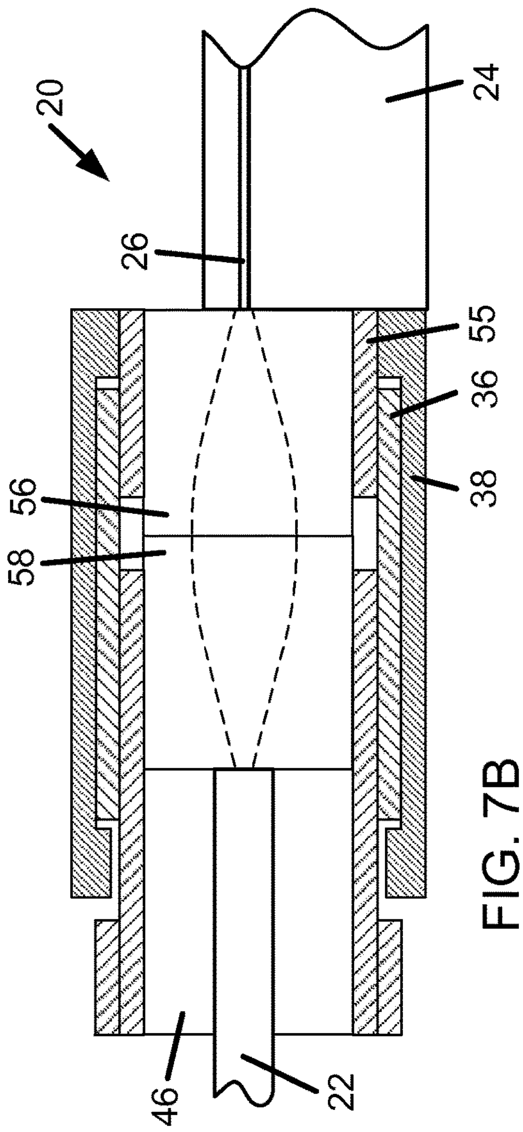
Figure 7C:
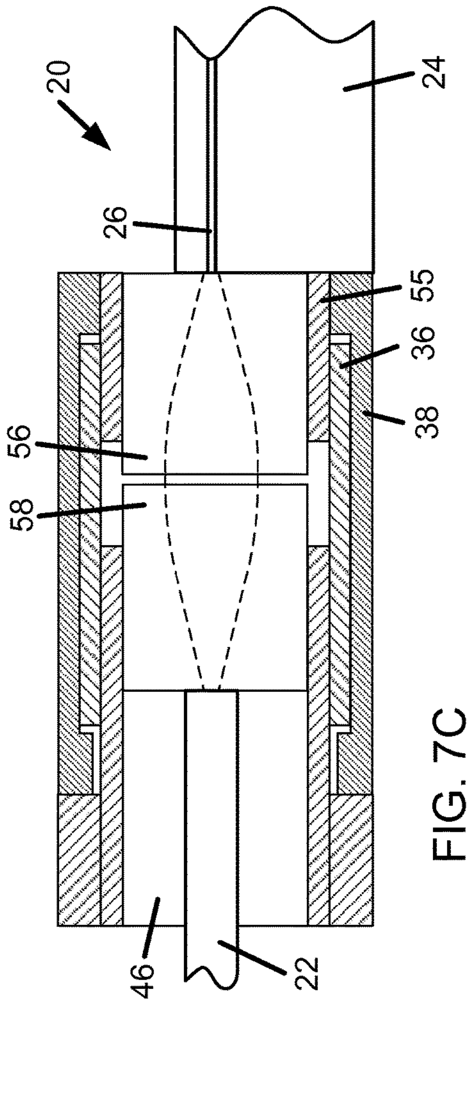
Figure 7D:
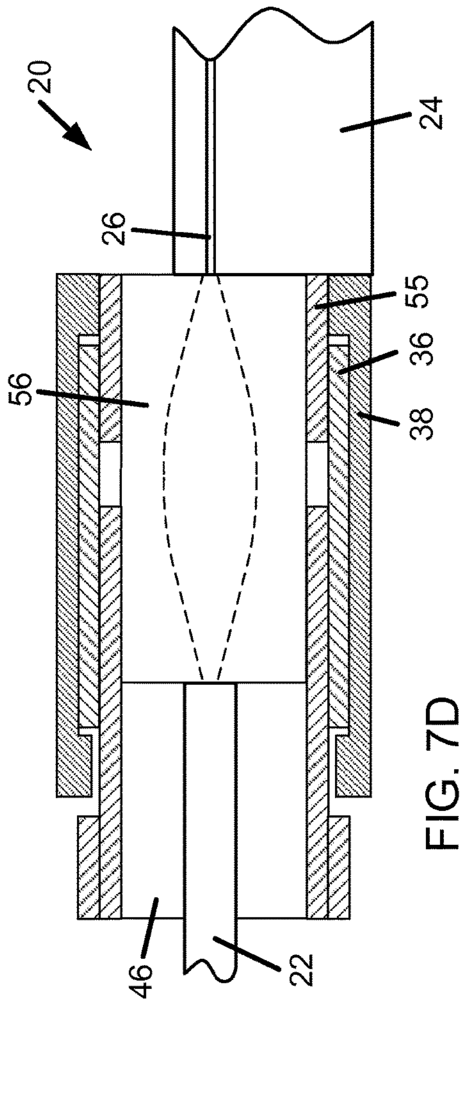

In some embodiments, such as best seen in FIG. 7B, the use of GRIN lenses may avoid the presence of an air gap between optical components, which is not the case using aspheric lenses. In other variants, such as shown in FIG. 7C, an air gap may be left voluntarily between the GRIN lenses if desired. In such an embodiment, an anti-reflection coating may advantageously be deposited on the surfaces of the GRIN lenses exposed to air. In yet another variant, shown in FIG. 7D, a single lens system (GRIN) of appropriate design can also be used. The lens (or lens system) can also be designed to provide mode matching between the on-chip optical waveguide 26 and the external optical fiber 22.

Figure 8:
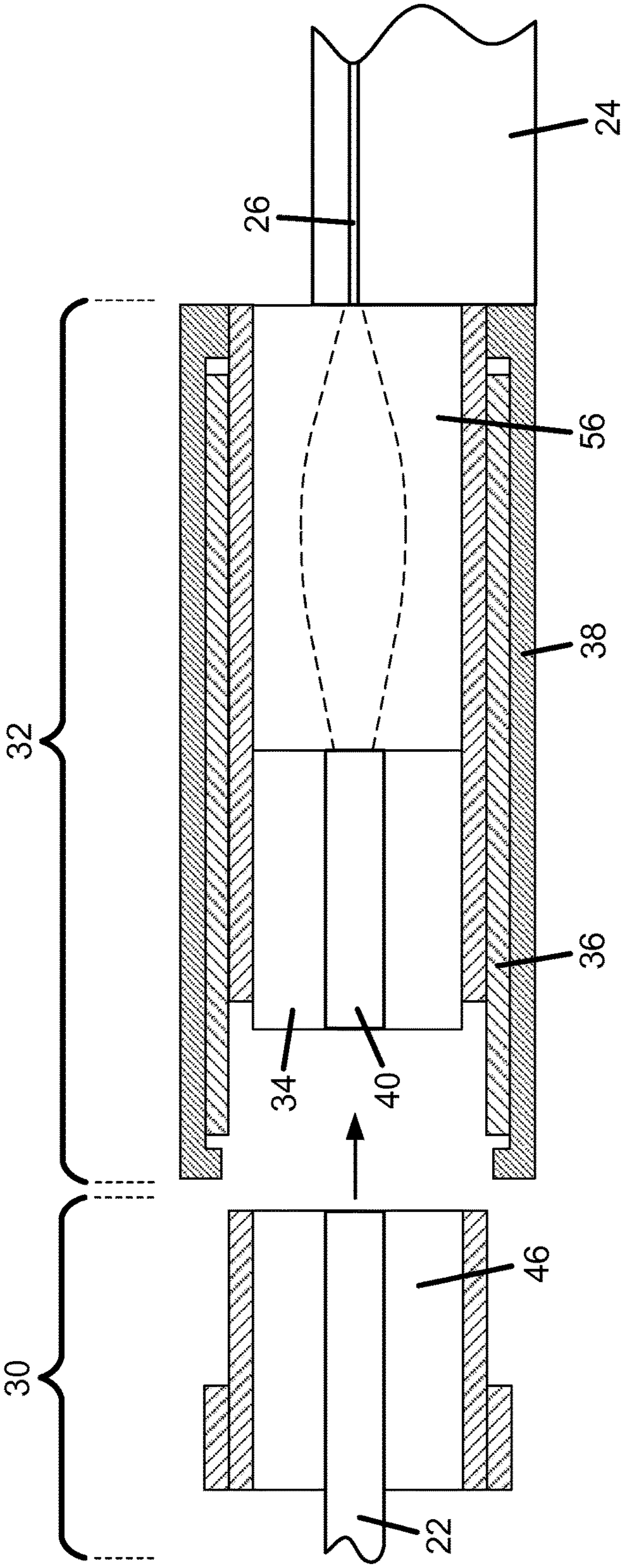
FIG. 8 is a schematized representation of an optical chip assembly combining both an optical fiber segment and a GRIN lens.

Referring to FIG. 8, there is shown another example where the connectorized interface 28 combines both an optical fiber segment 40 within a chip ferule 34, and a chip GRIN lens 56. In this example, the chip GRIN lens 56 provides mode matching between the on-chip optical waveguide 26 and the optical fiber 40, which can be connected to the external optical fiber 22 through a typical fiber connector 30.

In the case of expanded beams, it can be noted that tolerance to lateral misalignments of the optical elements is relaxed while tolerance to angular errors is tightened. However, in the case of GRIN lenses, the good planarity of the end faces of the GRIN lenses themselves ensures good angular alignment. Lens holders and/or cylindrical sleeves can also be used to ensure such angular alignment.

Figure 9A:
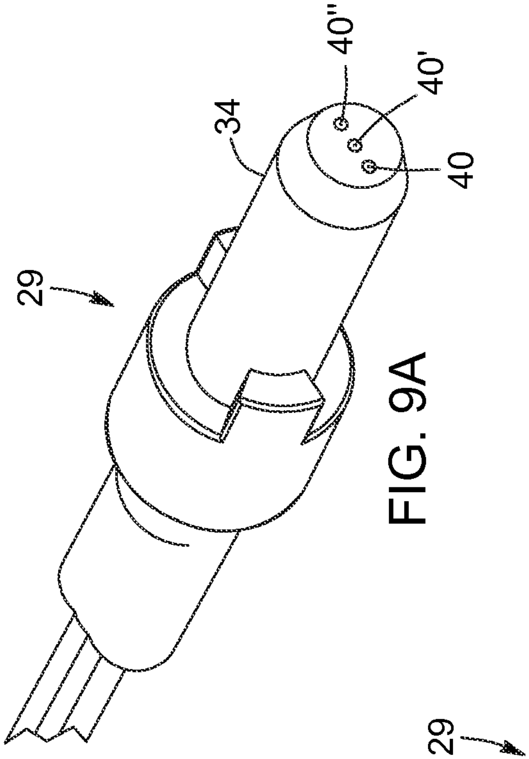
FIGS. 9A and 9B are schematized representation of a ferule and a V-groove array, respectively, embodying optical coupling elements for multiple external optical fibers to multiple corresponding on-chip optical chips.
Figure 9B:
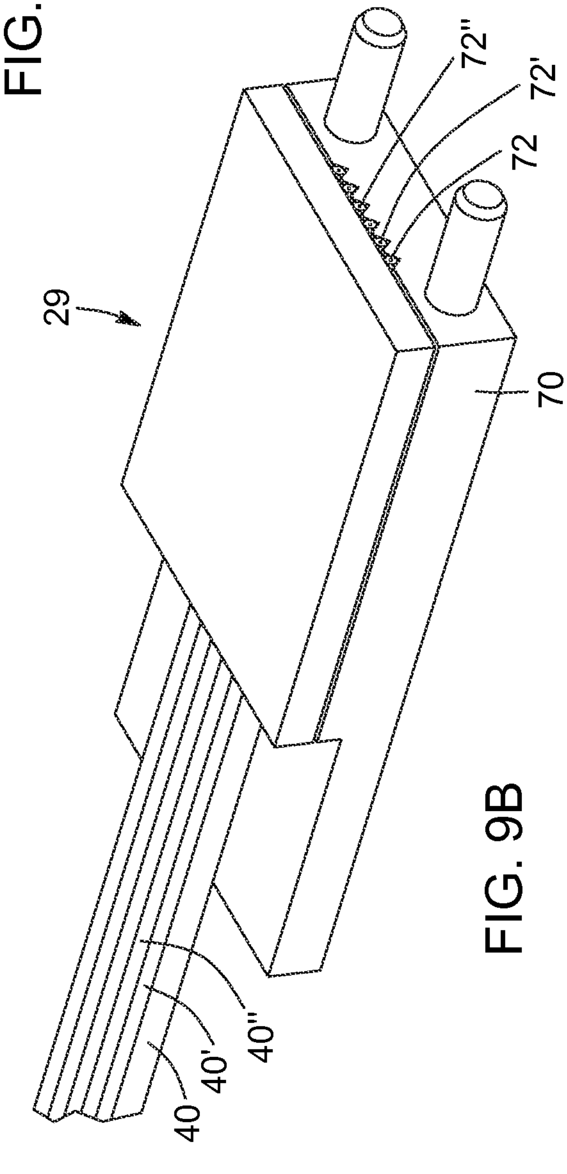

As will be readily understood by one skilled in the art, connectorized optical chip assemblies according to various implementations may be used to provide a potential connection to more than one external optical fiber onto a single optical chip. Indeed, as will be observed in FIGS. 3A to 3C and 4A, in the illustrated examples the optical chip 24 is shown as having two on-chip optical waveguides 26 each associated with its own connectorized interface 28. In other variants, a single connectorized interface 28 may provide optical coupling between a plurality of on-chip optical waveguides 26 and a corresponding plurality of external optical fibers 22. Referring to FIG. 9A, in one example, the optical coupling element 29 may for example include a chip ferrule 34 and a plurality of optical fiber segments 40, 40', 40" mounted in parallel inside the chip ferrule 34. Although only three optical fiber segments are shown in the illustrated example, it will be readily understood that a different number of optical fiber segments may be provided in other variants. Each optical fiber segment 40, 40', 40" is optically coupled with a respective on-chip optical waveguides. Referring to FIG. 9B, in another example the optical coupling element may define a V-groove array including a support plate 70 in which are provided a plurality of parallel V-grooves 72, 72', 72", . . . . A plurality of optical fiber segments 40, 40', 40" . . . is mounted inside these V-grooves, each optical fiber segment 40, 40', 40" being optically coupled with a respective one of the on-chip optical waveguides.

Advantageously, optical chip assemblies according to embodiments described herein can be compatible with reflow manufacturing processes and SMT assembly technology. Indeed, in preferred implementations the substrate, the optical chip, the connectorized interface and the mechanical support structure are all entirely made of materials heat resistant to a temperature used to melt solder in surface mount processes. As mentioned above, this temperature is 183° C. for lead containing solder and 220° C. for solder without lead. The external optical fibers can be connected to the optical chip after the optical chip subassembly has been soldered to a PCB or other substrate using a BGA or similar techniques.

Of course, numerous modifications could be made to the embodiments described above without departing from the scope of the invention.

The invention claimed is:

1. A connectorized optical chip assembly connectable to an external optical fiber having a fiber connector, comprising:

a substrate;

an optical chip extending over the substrate and having an on-chip optical waveguide; and a connectorized interface, comprising:

an optical coupling element mounted in optical alignment with the on-chip optical waveguide;

a chip connector engaging the optical coupling element and configured for mating with the fiber connector of the external optical fiber so as to provide an optical coupling of light between the optical coupling element and the external optical fiber; and a mechanical support structure supporting the connectorized interface onto the substrate, wherein the chip connector comprises:

a chip connector housing; and a guiding sleeve mounted in the chip connector housing, the guiding sleeve having a proximal end engaging the optical coupling element and a distal end opened and sized to receive an extremity of the fiber connector, wherein the guiding sleeve is longitudinally constrained and rotatably free-floating within the chip connector housing.

2. The connectorized optical chip assembly according to claim 1, wherein the connectorized interface is configured to enable a side coupling of light from the optical fiber into the on-chip optical waveguide.

3. The connectorized optical chip assembly according to claim 1, wherein the connectorized interface is configured to enable a surface coupling of light from the optical fiber into the on-chip optical waveguide.

4. The connectorized optical chip assembly according to claim 1, wherein the on-chip optical waveguide is one of a slab waveguide, a strip waveguide, a ridge waveguide and a rib waveguide.

5. The connectorized optical chip assembly according to claim 1, wherein the optical coupling element comprises a mode field adapter.

6. The connectorized optical chip assembly according to claim 1, wherein the optical coupling element comprises a chip ferule and at least one optical fiber segment mounted inside the chip ferule.

7. The connectorized optical chip assembly according to claim 6, wherein the optical fiber segment is coating-less or has a heat-resistant coating.

8. The connectorized optical chip assembly according to claim 6, wherein the at least one optical fiber segment comprises:

a proximal optical fiber segment having a high numerical aperture selected for light coupling with the on-chip optical waveguide; and a distal optical fiber segment having a low numerical aperture selected for light coupling with the external optical fiber, the proximal and distal optical fiber segments being joined by a splice extending within the chip ferule.

9. The connectorized optical chip assembly according to claim 1, wherein the optical coupling element comprises a chip lens positioned in optical alignment with the on-chip optical waveguide.

10. The connectorized optical chip assembly according to claim 9, wherein the chip lens comprises one of an aspherical lens and a graded-index lens.

11. The connectorized optical chip assembly according to claim 10, wherein the optical coupling element comprises a lens holder affixed to the optical chip, the chip lens being mounted in the lens holder.

12. The connectorized optical chip assembly according to claim 1, wherein the guiding sleeve defines a C-shaped cylindrical component having a nominal diameter slightly smaller than a diameter of the optical coupling element and made of a resilient material.

13. The connectorized optical chip assembly according to claim 1, wherein the mechanical support structure comprises a main block affixed to the substrate and traversed by a passage, the passage receiving the chip connector housing therethrough.

14. The connectorized optical chip assembly according to claim 13, wherein the main block is made of metal, ceramic or heat-resistant molded plastic.

15. The connectorized optical chip assembly according to claim 1, wherein the optical chip, the connectorized interface and the mechanical support structure are entirely made of materials heat resistant to at least a temperature used to melt solder in surface mount processes.

16. The connectorized optical chip assembly according to claim 15, wherein said temperature is 183 degrees Celsius for lead containing solder and 220 degrees Celsius for solder without lead.

17. The connectorized optical chip assembly according to claim 1, wherein the optical chip defines a Silicon on Insulator structure.

18. The connectorized optical chip assembly according to claim 1, wherein the optical chip comprises a plurality of parallel on-chip optical waveguides, and the optical coupling element comprises a chip ferrule and a plurality of optical fiber segments mounted in parallel inside the chip ferrule, each optical fiber segment being optically coupled with a respective one of the on-chip optical waveguides.

19. The connectorized optical chip assembly according to claim 1, wherein the optical chip comprises a plurality of parallel on-chip optical waveguides, and the optical coupling element comprises a V-groove array comprising a support plate having a plurality of parallel V-grooves provided therein and a plurality of optical fiber segments mounted inside said V-grooves, each optical fiber segment being optically coupled with a respective one of the on-chip optical waveguides.

20. A connectorized optical chip assembly connectable to an external optical fiber having a fiber connector, comprising:

a substrate;

an optical chip having an on-chip optical waveguide; and a connectorized interface, comprising:

an optical coupling element in optical alignment with the on-chip optical waveguide, the optical coupling element comprising a chip ferule and at least one optical fiber segment mounted inside the chip ferule;

a chip connector engaging the chip ferule and configured for mating with the fiber connector of the external optical fiber so as to provide an optical coupling of light between the at least one optical fiber segment and the external optical fiber; and a mechanical support structure supporting the connectorized interface onto the substrate, wherein the chip connector comprises:

a chip connector housing; and a guiding sleeve mounted in the chip connector housing, the guiding sleeve having a proximal end engaging the chip ferule and a distal end opened and sized to receive an extremity of the fiber connector, wherein the guiding sleeve is longitudinally constrained and rotatably free-floating within the chip connector housing.

21. The connectorized optical chip assembly according to claim 20, wherein the at least one optical fiber segment is coating-less or has a heat-resistant coating.

22. The connectorized optical chip assembly according to claim 20, wherein the at least one optical fiber segment comprises:

a proximal optical fiber segment having a high numerical aperture selected for light coupling with the on-chip optical waveguide; and a distal optical fiber segment having a low numerical aperture selected for light coupling with the external optical fiber, the proximal and distal optical fiber segments being joined by a splice extending within the chip ferule.

23. The connectorized optical chip assembly according to claim 20, wherein the ferule and the optical fiber segment, have a proximate endface affixed to the optical chip.

24. The connectorized optical chip assembly according to claim 20, wherein the chip connector housing is rigidly connected to the optical chip.

25. The connectorized optical chip assembly according to claim 20, wherein the guiding sleeve defines a C-shaped cylindrical component having a nominal diameter slightly smaller than a diameter of the chip ferule and made of a resilient material.

26. The connectorized optical chip assembly according to claim 20, wherein the mechanical support structure comprises a main block affixed to the substrate and traversed by a passage, the passage receiving the chip connector housing therethrough.

27. The connectorized optical chip assembly according to claim 20, wherein the optical chip, the connectorized interface and the mechanical support structure are entirely made of materials heat resistant to at least a temperature used to melt solder in surface mount processes.

* * * * *